(12) United States Patent
Kumar

(10) Patent No.: US 7,913,233 B2
(45) Date of Patent: Mar. 22, 2011

(54) PERFORMANCE ANALYZER

(75) Inventor: Amit Kumar, San Ramon, CA (US)

(73) Assignee: Bank of America Corporation, Charlotte, NC (US)

( * ) Notice: Subject to any disclaimer, the term of this patent is extended or adjusted under 35 U.S.C. 154(b) by 1148 days.

(21) Appl. No.: 11/536,328

(22) Filed: Sep. 28, 2006

(65) Prior Publication Data
US 2008/0098365 A1 Apr. 24, 2008

(51) Int. Cl.
*G06F 9/44* (2006.01)
*G06F 17/40* (2006.01)
(52) U.S. Cl. .................. 717/131; 717/127; 702/187
(58) Field of Classification Search .................. 717/127, 717/130, 158, 131; 702/186, 187
See application file for complete search history.

(56) References Cited

U.S. PATENT DOCUMENTS

| | | | |
|---|---|---|---|
| 5,828,883 A * | 10/1998 | Hall | 717/133 |
| 6,438,512 B1 * | 8/2002 | Miller | 702/186 |
| 6,643,613 B2 | 11/2003 | McGee et al. | |
| 6,823,382 B2 | 11/2004 | Stone | |
| 7,389,497 B1 * | 6/2008 | Edmark et al. | 717/130 |
| 2005/0155019 A1 * | 7/2005 | Levine et al. | 717/127 |
| 2005/0155026 A1 * | 7/2005 | DeWitt et al. | 717/158 |
| 2006/0075386 A1 * | 4/2006 | Loh et al. | 717/124 |
| 2006/0130001 A1 * | 6/2006 | Beuch et al. | 717/130 |
| 2007/0220495 A1 * | 9/2007 | Chen et al. | 717/130 |
| 2007/0294673 A1 * | 12/2007 | Guerrera et al. | 717/130 |
| 2008/0049640 A1 * | 2/2008 | Heinz et al. | 370/252 |
| 2008/0095049 A1 * | 4/2008 | Bugenhagen et al. | 370/229 |

* cited by examiner

*Primary Examiner* — Wei Y Zhen
*Assistant Examiner* — Chih-Ching Chow
(74) *Attorney, Agent, or Firm* — Michael A. Springs; Moore & Van Allen PLLC

(57) ABSTRACT

A method for performance analysis of a system may include capturing data including callee stack information and persisting the callee stack information in a form that can be queried. The method may also include generating a performance analysis report in response to a query.

28 Claims, 3 Drawing Sheets

PERFORMANCE ANALYZER

BACKGROUND OF THE INVENTION

The present invention relates to monitoring analyzing and managing performance of data processing systems, components of such systems, software applications operating on such systems and like, and more particularly to a method and system for performance analysis of data processing systems, such as a Java 2 Platform, Enterprise Edition (J2EE) environment, or similar environment or system.

Monitoring, analyzing and managing the performance of a data processing system, a web-based enterprise system, such as a Java 2 Platform, Enterprise Edition (J2EE) system, or similar systems and their components and application programming interfaces (APIs), can be extremely challenging, if not a close to an impossible task. Java and J2EE are trademarks of Sun Microsystems in the United States, other countries or both. Understanding which components and APIs are important to manage requires in-depth knowledge. Considering thousands of lines of code and that hundreds or thousands of components and APIs must be tracked continually, all of which may execute in seconds or milliseconds, the task of manually monitoring such systems becomes unfeasible for the administrator or infrastructure manager. Utilities have been developed to help, but to date these programs have been largely focused on preproduction development processes such as code profiling.

BRIEF SUMMARY OF THE INVENTION

In accordance with an embodiment of the present invention, a method for performance analysis of a system may include capturing data including callee stack information and persisting the callee stack information in a form that can be queried. The method may also include generating a performance analysis report in response to a query.

In accordance with an embodiment of the present invention, a method for performance analysis of a system may include capturing data related to operation of the system. The method may also include extracting callee stack trace information from the captured data and persisting the callee stack trace information in a form adapted to be queried. The method may further include generating a report using the callee stack trace information to permit identification of any performance issues.

In accordance with another embodiment of the present invention, a system for performance analysis of a data processing system or the like may include an entity manager to generate a plurality of log entries including information related to operation of the data processing system. The system may also include a log analyzer to extract callee stack trace information from the log entries. The system may further include an output device to present a report related to performance of the data processing system using the extracted callee stack trace information.

In accordance with another embodiment of the present invention, a computer program product for performance analysis of a system may include a computer usable medium having computer usable program code embodied therewith. The computer usable medium may include computer usable program code configured to capture data including callee stack information. The computer usable medium may also include computer usable program code configured to persist the callee stack information in a form that can be queried. The computer usable medium may also include computer usable program code configured to generate a performance analysis report in response to a query.

Other aspects and features of the present invention, as defined solely by the claims, will become apparent to those ordinarily skilled in the art upon review of the following non-limited detailed description of the invention in conjunction with the accompanying figures.

DETAILED DESCRIPTION OF THE INVENTION

Figure 1:
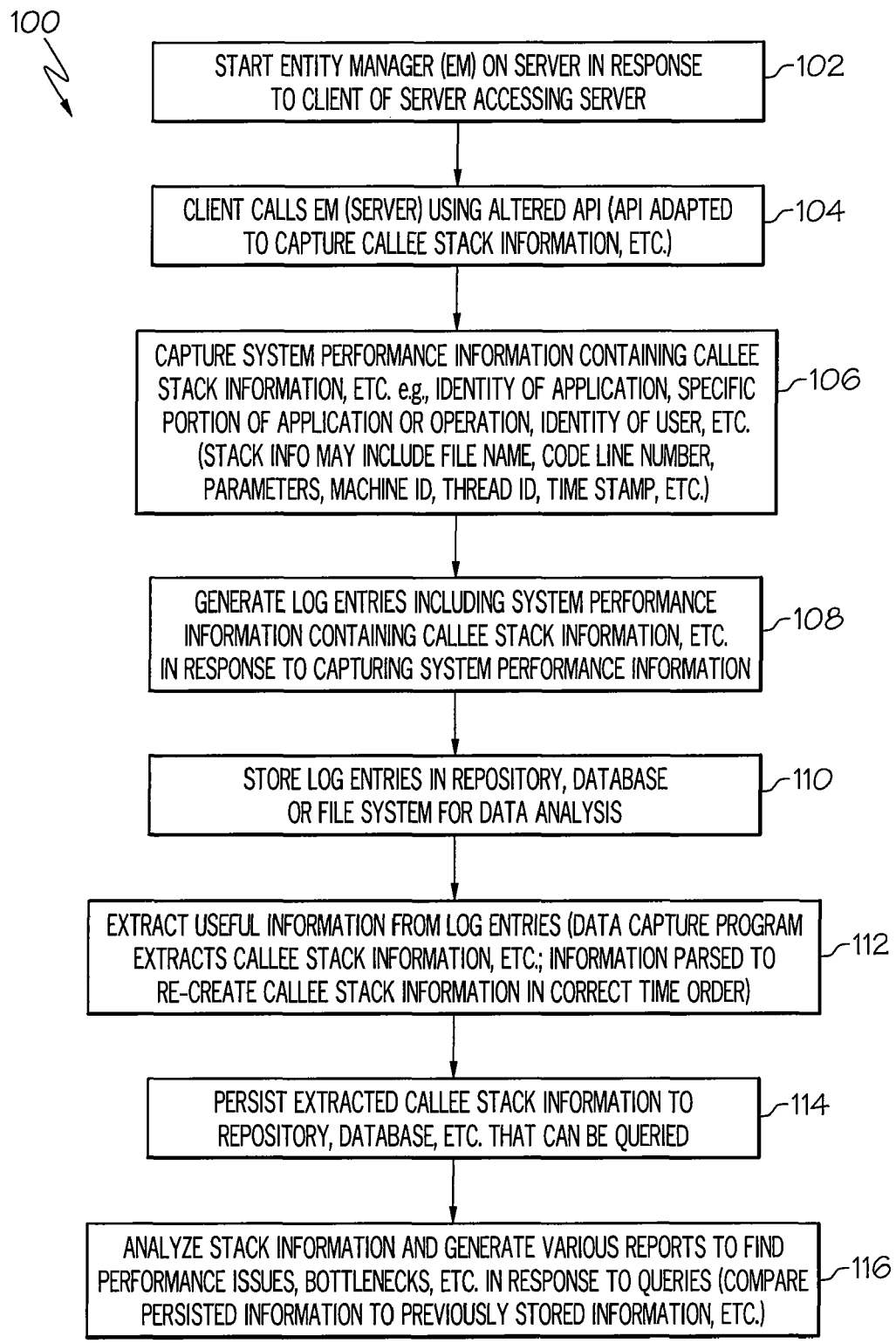
FIG. 1 is a flow chart of an example of a method for performance analysis of a data processing system or the like in accordance with an embodiment of the present invention.

The following detailed description of embodiments refers to the accompanying drawings, which illustrate specific embodiments of the invention. Other embodiments having different structures and operations do not depart from the scope of the present invention.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium, for example medium 350 in FIG. 3, having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium-could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or block.

FIG. 1 is a flow chart of an example of a method 100 for performance analysis of a data processing system or the like in accordance with an embodiment of the present invention. In block 102, an entity manager operable on a server or embodied in a server may be started in response to a client accessing the server. The client may call the entity manager or server using an altered application programming interface (API) or the like. The API may be altered or adapted to capture information related to performance of the system, such as callee stack information or other performance related data.

In block 106, information related to performance of the system may be captured. The system performance information may include callee stack information. The performance information may include information that identifies the application, a specific portion of the application or operation, identity of the user or other performance related information. The callee stack information may include a file name, a code line number or line numbers, parameters associated with the application or operation, machine ID, thread ID, time stamp, or similar information related to the stack and callee stack trace information.

A callee stack is a location for temporary storage. Parameters may be pushed onto the stack, and then a return address may be pushed onto the stack. The flow of execution must know where to return in a process or operation. A processor executes one instruction after the other and has to be told where to go or return. In order to tell the processor how to get back, the return address needs to be saved. The return address is the location in the program to be returned to after a function call. A "CALL" is an assembly instruction that performs this operation. A "RET" is an assembly instruction that uses the current value on the stack and the return address to transfer execution to that location. There may also be local variables and possibly other values that may be pushed onto the stack for temporary storage. This is one of the reasons an array or an address of any local variable can never be returned. They disappear when the function returns.

In block 108, a plurality of log entries may be generated in response to capturing the system performance information. The log entries may include the captured system performance information which contains the callee stack information. In block 110, the log entries may be stored in a repository, database or file system for data analysis.

In block 112, the log entries may be analyzed. Useful information, such as the callee stack information, may be extracted from the log entries. A data capture program may extract the callee stack trace information from the other captured information in the log entries. The captured system performance information in the log entries may be parsed to re-create the callee stack information in correct time order. An example of a method for analyzing the log entries and callee stack trace information will be described in more detail with reference to FIG. 2.

In block 114, the extracted callee stack information may be persisted or stored in a repository, database or the like that can be queried. The extracted callee stack information may be persisted in a format that can be queried to extract data for generating reports related to system performance.

In block 116, the callee-stack information may be analyzed and various reports may be generated to help identify system performance issues, bottlenecks or the like in response to queries. The analysis may include comparing persisted information to previously stored information to identify trends or changes in performance level. Other statistical analysis of the information may be performed to identify possible performance issues and to help develop remedial measures.

Figure 2:
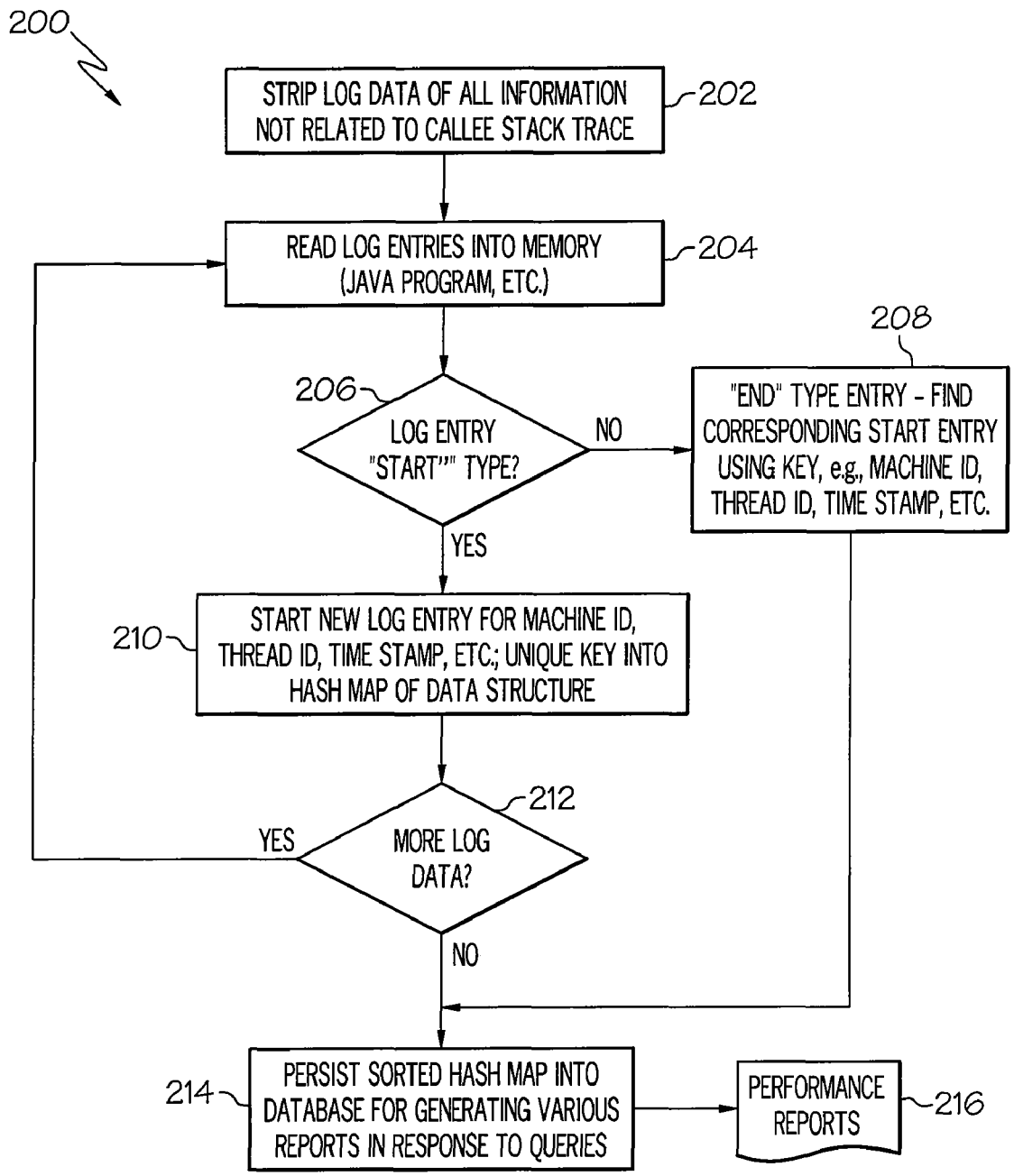
FIG. 2 is a flow chart of an example of a method for data analysis for use with the performance analysis method of FIG. 1 in accordance with an embodiment of the present invention.

FIG. 2 is a flow chart of an example of a method 200 for data analysis for use with the performance analysis method 100 of FIG. 1 in accordance with an embodiment of the present invention. In block 202, the log entries or data may be stripped of all information not related to the callee stack trace. In block 204, the log entries may be read into memory or a database. A Java program or similar program may be used to read the log data into memory.

In block 206, a determination may be made whether the log entry is a "start" type or an "end" type. If the log entry is an "end" type, the method 200 may advance to block 208. In block 208, a start entry corresponding to the end type entry may be found. The corresponding start entry may be found using a key. Examples of the key may include a machine ID, a thread ID, a time stamp or other data that may lead to the start entry corresponding to the end type entry. From block 208, the method 200 may advance to block 214 described below.

If the log entry is a "start" type in block 206, the method 200 may advance to block 210. In block 210, a new log entry may be started for the machine ID, thread ID, time stamp and any other related data. A unique key into a hash map of the log entry data structure may be formed. The unique key may be formed using the machine ID, thread ID, time stamp or the like. The unique key may be generated by any known method.

In block 212, a determination may be made if there is more log data or log entries. If so, the method 200 may return to block 204 and the method 200 may proceed as previously described. If there is no more log data, the method 200 may advance to block 214.

In block 214, the sorted hash map may be persisted into a database for generating various reports in response to queries. The various reports may include performance reports 216 to permit identification of any performance issues, bottlenecks or the like. The sorted hash map may permit reports to be generated enabling a determination of a specific cause for the performance issues, a section of the code or specific line numbers of code in question, specific users or operations when performance issues arise or other information to pin point the cause of performance issues, bottlenecks or the like and to provide possible incite to remedial action.

Figure 3:
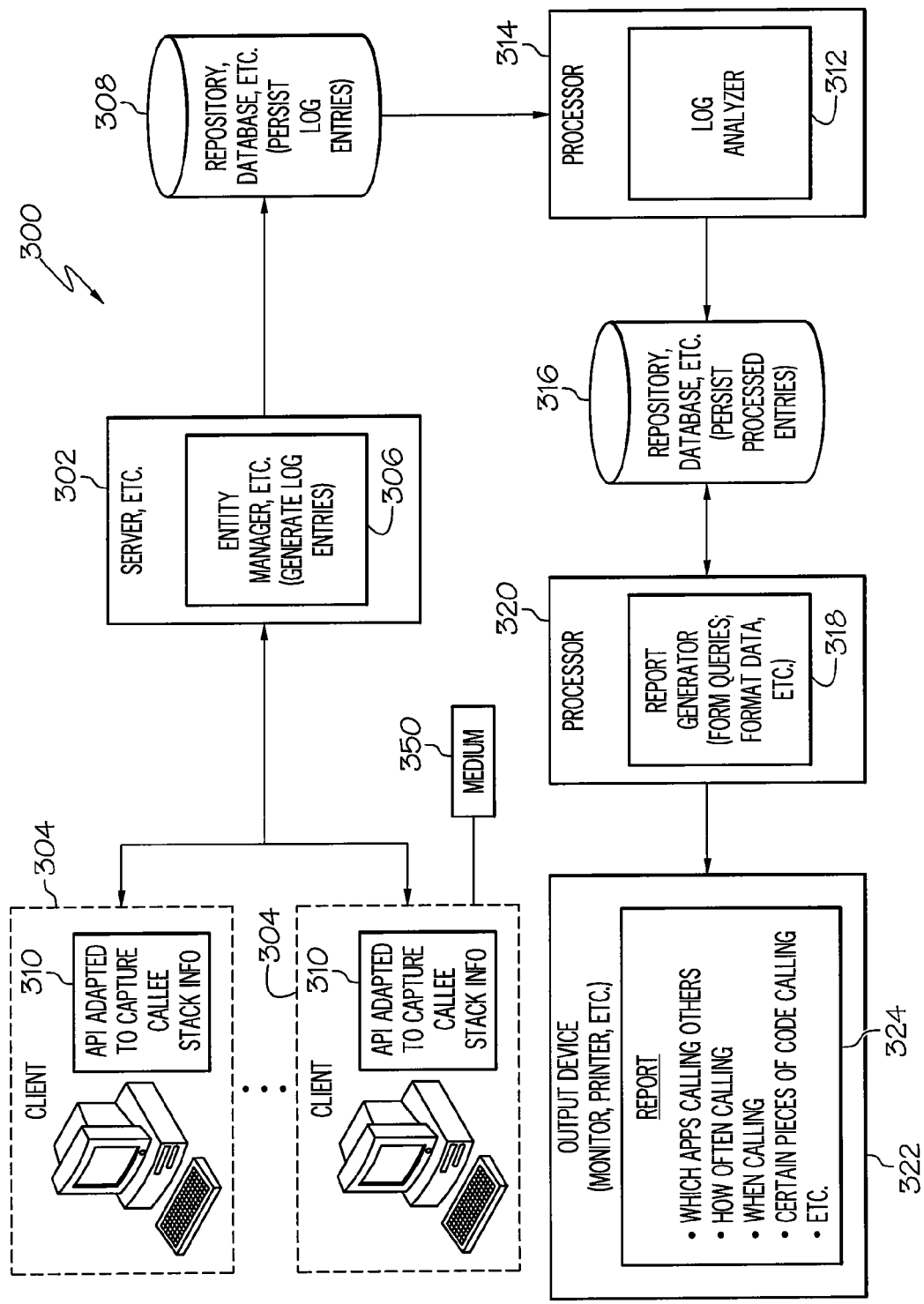
FIG. 3 is block diagram of an example of a system for performance analysis of a data processing system in accordance with an embodiment of the present invention.

FIG. 3 is block diagram of an example of a system 300 for performance analysis of a data processing system or the like in accordance with an embodiment of the present invention. The methods 100 and 200 of FIGS. 1 and 2, respectively, may be embodied in the system 300. The system 300 may include a server 302 to collect or receive performance information from a client 304. The performance information may be related to a data processing system, a web-based enterprise system, such as a J2EE system, or similar systems and their components and APIs. Similar to that previously discussed, the performance information may include callee stack information or the like. An entity manager 306 may be operable on the server 302 to log entries including the performance information related to operation of the data processing system, J2EE system or the like. The entity manager 304 may be embodied in the server 302. The log entries may be persisted or stored on a repository, database system 308 or the like.

The entity manager 302 may be started in response to being accessed by the client 304. An API 310 may be associated with the client 304 and/or the entity manager 306 or server 302. The API may be altered or adapted to capture the system performance information including the callee stack information.

The system 300 may also include a log analyzer 312. The log analyzer may be operable on or embodied in a processor 314. The log analyzer 312 may process the log entries to extract the callee stack information similar to that previously discussed. The log analyzer 312 may parse the captured system performance information to re-create the callee stack information in correct time order. The extracted callee stack information may be persisted or stored in another database system 316 or repository that can be queried. The callee stack information may be persisted in a form that can be queried to extract data for generating reports related to system performance.

The system 300 may also include a report generator 318. The report generator may be operable on or may be embodied on a processor 320. The processor 320 and 314 may be one processor or separate processors. The report generator 318 may form queries to extract data form the callee stack trace information, format data to generate reports and may perform other analysis related to the callee stack information.

An output device 322 or devices may be provided to present a report 324 related to performance of the data processing system or the like using the extracted callee stack trace information processed by the report generator 318. The report 324 may be used to facilitate identification of performance issues, such as bottlenecks, inefficient code, code errors or other anomalies affecting performance. The output device 322 or devices may include a printer, monitor, disk drives or other output devices. The report 324 may include performance information, such as which applications are calling others, how often calling other applications, when calling, what other operations may be going on, what portions of code are calling or operating when call is performed, or other information or statistics.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method for performance analysis of a system, comprising:

capturing data including callee stack information, wherein the callee stack information comprises system performance information;

generating a plurality of log entries including data comprising the callee stack information;

storing the log entries in a database for data analysis persisting the callee stack information in a form that can be queried;
extracting information from the log entries, the extracting comprising:
determining if a log entry is a start type or end type;
when the log entry is a start type, starting a new log entry including a unique key into a hash map of a data structure of the logged entries; and
when the log entry is an end type determining a corresponding start entry using a key;
persisting the hash map into a database for generating performance analysis reports in response to queries; and
generating a performance analysis report in response to a query.

2. The method of claim 1, wherein capturing data including callee stack information comprises at least one of capturing a file name, capturing a code line number, capturing any parameters related to the file and code line number, capturing a machine ID, capturing a thread ID and capturing a time stamp.

3. The method of claim 1, further comprising starting an entity manager to capture the data in response to a client accessing a server on which the entity manager is operable.

4. The method of claim 1, wherein capturing the data comprises using an altered application program interface adapted to capture callee stack information.

5. The method of claim 1, further comprising extracting callee stack trace information from the log entries.

6. The method of claim 1, further comprising stripping the log entries of all information not related to callee stack trace information.

7. The method of claim 1, further comprising:
sorting the hash map according to the unique key; and
persisting the sorted hash map into another database for generating reports related to performance of the system.

8. The method of claim 7, further comprising forming the unique key using at least one of a group including a machine ID, a thread ID, and a time stamp.

9. The method of claim 1, further comprising parsing the captured data to re-create the callee stack information in a correct time order.

10. A method for performance analysis of a system, comprising:
capturing data related to operation and performance of the system;
generating a plurality of log entries over time, each log entry including captured data;
storing the plurality of log entries in a first database system;
extracting callee stack trace information from the captured data, the extracting comprising:
determining if a log entry is a start type;
when the log entry is a start type, starting a new log entry including a unique key into a hash map of a data structure of the logged entries; and
when the log entry is an end type determining a corresponding start entry using a key;
persisting the callee stack trace information in a form adapted to be queried; and
generating a report using the callee stack trace information to permit identification of any performance issues.

11. The method of claim 10, wherein extracting the callee stack information comprises parsing the captured data to re-create the callee stack information in a corrected time order.

12. The method of claim 10, further comprising persisting the extracted callee stack information in a second database system that can be queried to generate the report.

13. The method of claim 10, further comprising generating a unique key into a hash data map of the captured data.

14. The method of claim 13, further comprising:
sorting the hash data map using the unique key; and
persisting the sorted hash data map in a database for generating the report.

15. The method of claim 14, further comprising forming the unique key using at least one of a group including a machine ID, a thread ID, and a time stamp.

16. A system for performance analysis of a data processing system, comprising:
a server configured for capturing data including callee stack information, wherein the callee stack information comprises system performance information
an entity manager configured to:
generate a plurality of log entries stored in a storage medium, the log files including information related to operation and performance of the data processing system; and
store the log entries in a database for data analysis persisting the callee stack information in a form that can be queried;
a log analyzer, comprising a processor, configured to:
extract callee stack trace information from the log entries, the extracting comprising:
determining if a log entry is a start type;
when the log entry is a start type, starting a new log entry including a unique key into a hash map of a data structure of the logged entries; and
when the log entry is an end type determining a corresponding start entry using a key;
persist the hash map into a database for generating performance analysis reports in response to queries; and
an output device to present a report related to performance of the data processing system using the extracted callee stack trace information.

17. The system of claim 16, further comprising a database system to store the extracted callee stack trace information in a form adapted to be queried for generating the report.

18. The system of claim 17, further comprising another database system to persist the log entries.

19. The system of claim 16, further comprising an application program interface adapted to capture the callee stack trace information.

20. The system of claim 16, further comprising a report generator to form queries to extract data from the callee stack trace information to generate the report.

21. A system for performance analysis of a data processing system, comprising:
a computer memory;
a first database configured to:
receive a plurality of generated log entries that include data comprising the callee stack information; and
persist the generated log entries related to performance of the data processing system; and
a log analyzer configured to extract callee stack trace information from the log entries, the extracting comprising:
determining if a log entry is a start type;
when the log entry is a start type, starting a new log entry including a unique key into a hash map of a data structure of the logged entries; and
when the log entry is an end type determining a corresponding start entry using a key; and a second database configured to persist the extracted callee stack trace information, the extracted callee stack trace information being configured to be analyzed to find performance issues.

22. The system of claim 21, further comprising a server to generate the log entries.

23. The system of claim 21, further comprising an application program interface adapted to capture the callee stack trace information.

24. A computer program product for performance analysis of a system, the computer program product comprising:
- a non-transitory computer usable medium having computer usable program code embodied therewith, the computer usable medium comprising:
  - computer usable program code configured to capture data including callee stack information;
  - computer usable program code configured to generate a plurality of log entries including data comprising the callee stack information;
  - computer usable program code configured to store the log entries in a database for data analysis persisting the callee stack information in a form that can be queried;
  - computer usable program code configured to extract information from the log entries comprising:
    - computer usable program code configured to determine if a log entry is a start type;
    - computer usable program code configured to start a new log entry including a unique key into a hash map of a data structure of the logged entries when the log entry is a start type; and
    - computer usable program code configured to determine a corresponding start entry using a key when the log entry is an end type;
  - computer usable program code configured to persist the callee stack information in a form that can be queried; and
  - computer usable program code configured to generate a performance analysis report in response to a query.

25. The computer program product of claim 24, further comprising computer usable program code configured to generate a plurality of log entries including the data comprising the callee stack information.

26. The computer program product of claim 24, further comprising computer usable program code configured to parse the captured data to re-create the callee stack information in a correct time order.

27. The computer program product of claim 24, further comprising computer usable program code configured to analyze the callee stack information to find performance issues.

28. The computer program product of claim 24, further comprising computer usable program code configured to compare persisted information to previously stored information to identify any performance issues or bottlenecks.

* * * * *